Inventor

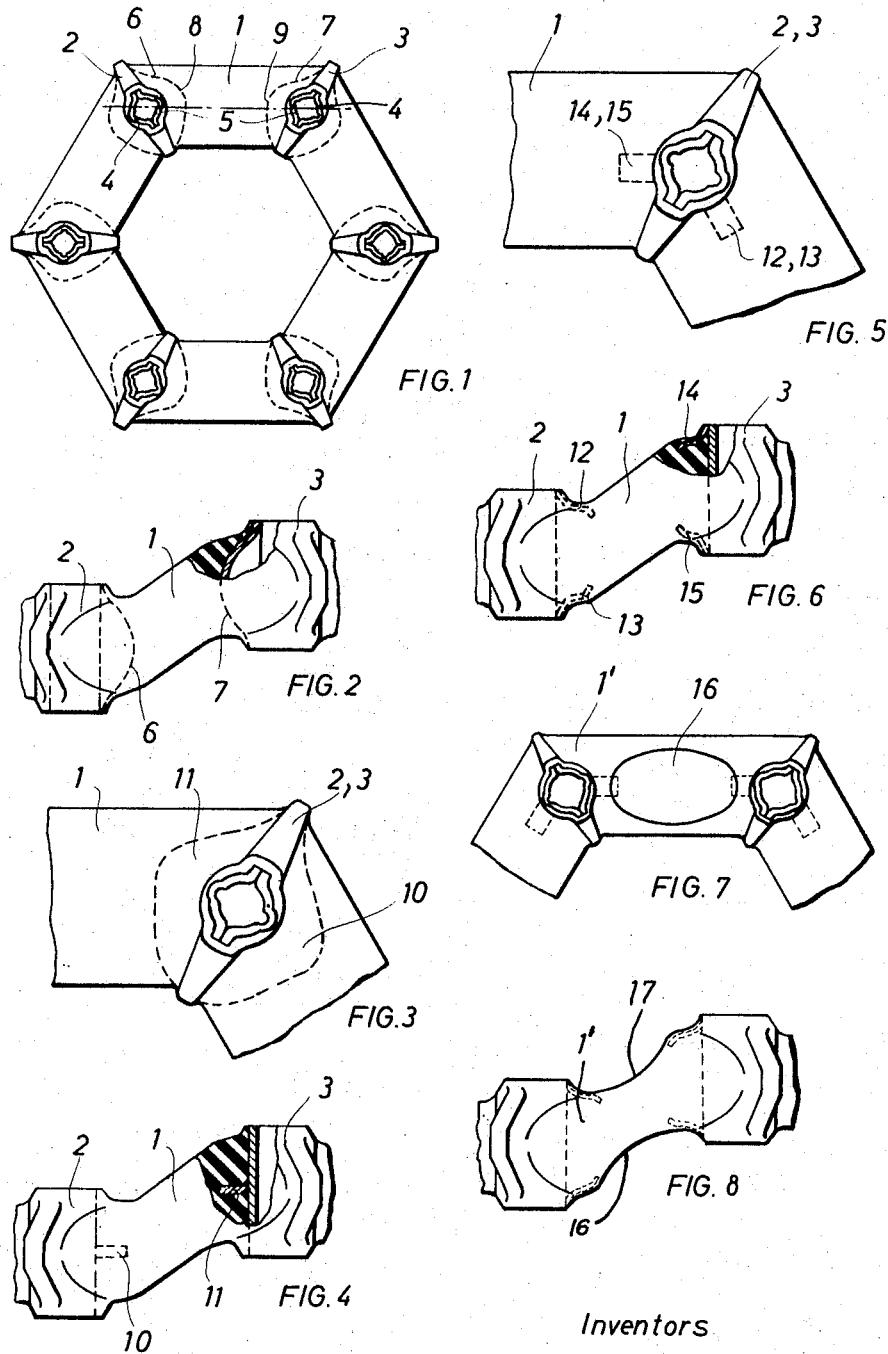

Rolf SCHUMACHER &
Paul VOSSIECK

By *Spencer & Kaye*

ATTORNEYS

United States Patent Office 3,353,373
Patented Nov. 21, 1967

3,353,373
FLEXIBLE COUPLING
Rolf Schumacher and Paul Vossieck, Burscheid, Germany, assignors to Goetzewerke Friedrich Goetze A.G., Burscheid, Germany
Filed Feb. 17, 1966, Ser. No. 528,132
Claims priority, application Germany, Mar. 25, 1965, G 43,169
7 Claims. (Cl. 64—11)

ABSTRACT OF THE DISCLOSURE

A flexible shaft coupling including a plurality of column-like springs made from an elastic material and arranged to form a polygonal ring, with a plurality of metal parts interposed between the springs as a part of the polygonal ring for connecting the flexible coupling to the coupling plate, and metal reinforcements having bulge-like projections extending transversely to the axis of the metal parts and which are completely surrounded by the material of the spring.

---

The present invention relates to a flexible coupling, and more particularly to a flexible shaft coupling for motor vehicles, comprising several column-like springs made from an elastic material and arranged in a polygonal ring and having a plurality of metal parts, such as adapter sleeves interposed between them for the connection of coupling plates thereto.

Flexible couplings for the connection of non-aligned shafts are known and are generally provided with springs in the form of cushions or buffers made from rubber or other elastic material for the transfer of power from one coupling part to another. In order to tightly secure the rubber cushions between the coupling plates, the cushions are generally prestressed which results in an increase in the life-span of these elements. Adapter sleeves are generally connected to the end surfaces of the rubber cushions in a firmly bonded manner, for example, by vulcanizing, so that they adhere to the end surfaces even when the cushions are stressed to a point exceeding their stress limit. Accordingly, an uninterrupted polygonal ring is produced and, if the coupling is to be used for relatively high angular deflection or the like, that is, in order to permit the rubber cushions to bend to a substantial degree, the cushions must be relatively long in the axial direction. This, however, results in sharp bending of the rubber cushions and in order to remedy this sharp bending, the rubber cushions in some prior art arrangements have been provided with a metallic shell-like housing to partially prevent the free expansion of the cushions.

It is also known to design the rubber cushions for the coupling with a generally column-like, straight-line axis with the rubber cushions being connected to the metal parts facing them by vulcanization. The end surfaces of the rubber cushions and the metal parts attached thereto are generally arranged in planes, preferably intercepting each other in the coupling axis, in order to stress the individual rubber cushions at right angles to their longitudinal axis and to thereby prevent a sharp bending of these cushions. The prestressing of the rubber cushions and the provision of the cushions with an average length which exceeds the average diameter of the cushion results in an increase in the life-span of the coupling. Such flexible couplings have proved to be of value in the motor vehicle industry and although the life of the couplings has been increased somewhat, a further increase is needed. Also, flexible couplings of small structural size even though designed in the afore-described manner, are still subject to a very limited life-span due to the small size thereof.

It is therefore an object of the present invention to provide a new and improved flexible shaft coupling.

It is a further object of the present invention to provide a flexible shaft coupling of small structural size and having a relatively long life-span.

According to the present invention, a flexible coupling having rubber cushions is provided with metallic connection surfaces such as adapter sleeves having connected thereto reinforcements in the form of bulge-like protrusions which are positioned approximately in the direction of the rubber spring axis and are entirely surrounded by the material of the rubber spring. Accordingly, the stresses generally produced in the connection surfaces are better distributed so that substantially greater forces can be transferred by flexible couplings having small structural sizes.

According to a feature of the invention, the bulge-like protrusions are preferably designed to have a disc shape and are arranged transversely with respect to the adapter sleeve axis with the connection surfaces for the protrusions being rounded in order to prevent damage to the rubber. The bulges can also form a unit with the metal part or may be connected with the metal part by welding, soldering or the like.

Additional objects and advantages of the present invention will become apparent upon consideration of the following description when taken in conjunction with the accompanying drawings in which:

FIGURE 1 is a front view of a polygonal flexible ring coupling according to the present invention.

FIGURE 2 is a top view, partly in cross section, of a portion of the polygonal ring of FIGURE 1.

FIGURE 3 is an enlarged front view of a portion of a polygonal ring having a different type of reinforcement.

FIGURE 4 is a top view partly in cross section of the portion of the ring of FIGURE 3 and showing the reinforcement.

FIGURE 5 is an enlarged fragmentary front view of another embodiment of a polygonal ring according to the present invention.

FIGURE 6 is a top view, partly in cross section, of the portion of the polygonal ring shown in FIGURE 5.

FIGURE 7 is a front view of an embodiment of a polygonal ring according to the present invention wherein the elastic portion is provided with constrictions.

FIGURE 8 is a top view of the polygonal ring of FIGURE 7.

Figure 9:
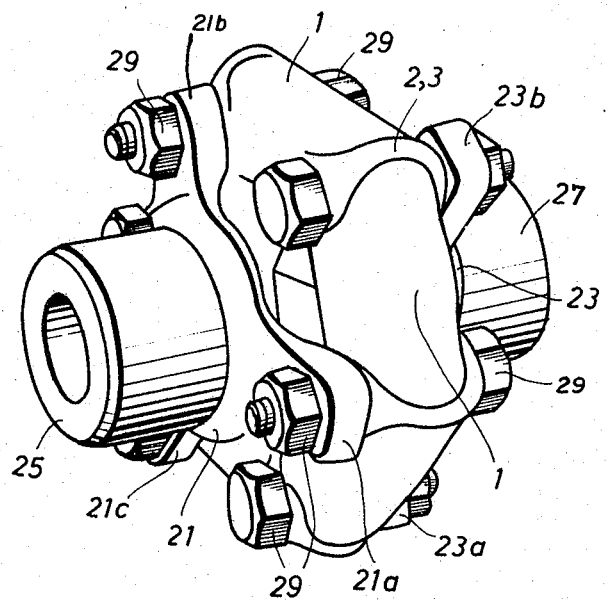
FIGURE 9 is a perspective view of a flexible coupling and coupling plates according to the present invention.

Referring now to the drawings, there is shown in FIGURE 1 a polygonal ring forming a flexible coupling for the transfer of motion between two shafts and having rubber springs or cushions 1 connected to metal parts 2 and 3 by vulcanization. The metal parts 2 and 3 generally comprise half-shells 4 and 5 forming an adapter sleeve for the connection of a coupling plate mounted at the end of the shaft. According to the invention, it is particularly advantageous to work the metal half-shell portions by embossing, punching, or other similar working so as to form reinforcements in the form of protrusions or bulges while shaping the half-shells. If the half-shells are formed by casting, the reinforcements may be cast as a part thereof so that the bulges are included without abrupt transitions. In both cases, the reinforcements improve the connection conditions for the rubber springs and increase at the same time the solidity of the metal parts. As shown in FIGURE 1, the profiles of the reinforcements are defined by the dashed lines 6 and 7 and extend symmetrically from the metal parts 2 and 3 in the direction of the axis of the spring 1 and approximately transversely thereto. The furthest extensions or the highest elevations 8 and 9 of the reinforcements are positioned outside of the axis of the rubber springs in the prestressed condition and prior to the coupled shafts being driven, in order to prevent an over-stressing of the rubber along the axis.

As shown in FIGURE 2, the rubber spring is firmly bonded to the adapter sleeve 3 and the reinforcements 6 and 7 are provided so that the shortest distance between the apexes of the reinforcements is approximately equal to the average cross section of the rubber spring which connects the two reinforcements. The distance between the reinforcing inserts, which may be a little longer or a little shorter than the average cross section of the rubber, serves to prevent the rubber spring from being shorn off when two shaft ends are displaced with respect to each other and move against each other under pressure, that is, the spring is permitted to bend to a substantial degree without shearing the spring.

In FIGURES 3 and 4, there is shown another embodiment of the present invention wherein the reinforcements 10 and 11 are in the form of relatively thin flat metal disc-like pieces which are connected, such as by welding, to the adapter sleeves 2 and 3 at approximately the middle portion of the sleeves as shown in FIGURE 4. Although the projection 11 is a flat metal piece, it is provided with a varying edge profile as shown in FIGURE 3 and the furthest extension of the profile is arranged outside of the spring axis.

In contradistinction to the arrangement of the reinforcements in FIGURES 3 and 4, FIGURES 5 and 6 show another embodiment of the present invention wherein the projections 12 and 13, 14 and 15 are provided at the edge regions of the adapter sleeves 2 and 3, respectively, and are also welded to the sleeves. By providing these projections about the edge regions of the metal sleeves, the edge stresses of the rubber springs are substantially reduced.

There is shown in FIGURES 7 and 8 a further embodiment of the present invention, where in addition to the provision of the projections on the sleeves 2 and 3, there are also provided constrictions 16 and 17 in the central region of the rubber spring 1'. The provision of the constriction results in a further improvement of the flexible coupling in that there is thus provided a cross section in the middle region of the spring that is smaller than the cross section in the region of the connection surfaces. Therefore, the rubber spring is provided with an average length which exceeds the average diameter of the spring which results in an increase in the life-span of the coupling ring since the spring may be bent to a substantial degree without being destroyed.

Figure 10:
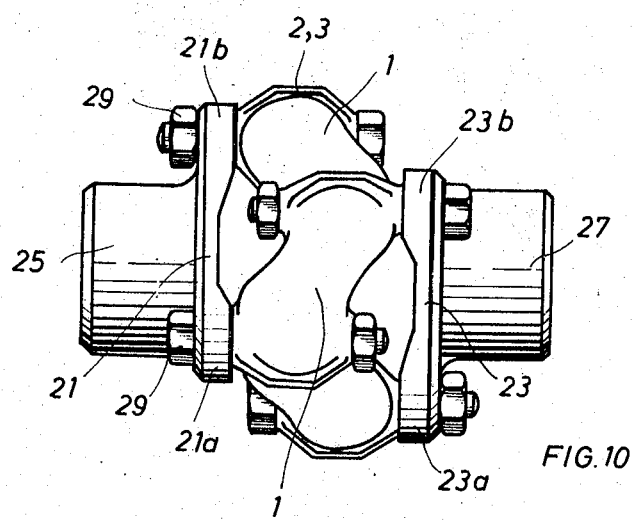
FIGURE 10 is a side view of the coupling arrangement of FIGURE 9.

Referring now to FIGURES 9 and 10, there is shown a perspective view and side view, respectively, of a flexible coupling constructed according to the present invention and disposed between two coupling plates 21 and 23. The adapter sleeves 2 and 3 are vulcanized to the rubber springs 1 at the ends thereof and thus form a polygonal ring. As shown, each of the coupling plates 21 and 23 is provided with a hub 25 and 27, respectively, for mounting on the end of a shaft and each plate further includes three flanges 21a, b, and c, and 23a, b, c, extending from the region of the hub and adapted to seat on alternate adapter sleeves. The flanges are connected to the adapter sleeves by any suitable mounting means such as nuts and bolts 29.

As shown in FIGURE 10, the flexible coupling may be subjected to various deformation forces including a shearing and twisting force resulting when the two shafts are displaced with respect to each other and move against ecah other under pressure. These forces generally cause rapid destruction of the coupling which thus has a short-life span. However, with the coupling of the present invention, i.e., a coupling having the afore-described reinforcing inserts, the coupling is sufficiently stabilized so that the coupling can withstand such destructive forces. Thus, due to the increased stability, the life-span of the coupling is increased and is more adaptable for motor vehicle use.

Accordingly, the present invention provides a flexible coupling which may be constructed in small structural sizes for transferring forces considerably greater than have heretofore been possible by flexible coupling rings of the same size. Since these couplings are mainly used in the motor vehicle industry where the space for installation of bigger couplings is not available, the small size of the coupling, according to the present invention, provides for the first time the possibility of transferring the necessary moments of rotation in the smallest of structural spaces. Also, due to the reinforcement provided by the present invention, the life-span of couplings is increased so as to make them more susceptible for use in the motor vehicle industry.

It will be understood that the above description of the present invention is susceptible to various modifications, changes, and adaptations, and the same are intended to be comprehended within the meaning and range of equivalents of the appended claims.

What is claimed is.

1. A flexible shaft coupling, comprising in combination:
    a plurality of column-like springs made from an elastic material and arranged to form a polygonal ring;
    a plurality of metal parts interposed between said springs as a part of the polygonal ring for connecting the flexible coupling to coupling plates; and
    metal reinforcements connected to said metal parts, said reinforcements having bulge-like projections which extend approximately transversely to the axis of said metal parts and approximately transversely to the axis of said springs and which are completely surrounded by the material of said springs.

2. A flexible coupling as defined in claim 1, wherein said reinforcements are disc-like in shape.

3. A flexible coupling as defined in claim 2, wherein the distance between two adjacent reinforcements in a single spring corresponds to at least the average cross section of said spring.

4. A flexible coupling as defined in claim 3, wherein said springs are made from rubber and are provided with constrictions in the middle region thereof.

5. A flexible coupling as defined in claim 2, wherein said metal parts comprise adapter sleeves and said metal reinforcements are connected thereto by a welded or soldered joint.

6. A flexible coupling as defined in claim 2, wherein said metal parts comprise adapter sleeves and said metal reinforcements are integrally formed from said sleeves and extend therefrom.

7. A flexible coupling as defined in claim 1, wherein the furthest extension of said metal reinforcements is positioned outside of the spring axis.

References Cited

UNITED STATES PATENTS 2,982,118   3/1961   Franceschetti et al. ___ 64—11 X

FOREIGN PATENTS 483,053   7/1953   Italy.
1,119,063   5/1956   Germany.
1,205,783   8/1959   France.

HALL C. COE, Primary Examiner.